(12) United States Patent
Joshi et al.

(10) Patent No.: US 8,171,278 B2
(45) Date of Patent: May 1, 2012

(54) BOOTING A COMPUTER SYSTEM FROM CENTRAL STORAGE

(75) Inventors: Kiran Joshi, San Jose, CA (US); Sirish Raghuram, San Jose, CA (US); Bich Cau Le, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 520 days.

(21) Appl. No.: 12/189,737

(22) Filed: Aug. 11, 2008

(65) Prior Publication Data

US 2010/0037041 A1  Feb. 11, 2010

(51) Int. Cl.
G06F 9/24 (2006.01)
(52) U.S. Cl. .............................. 713/2; 713/1; 709/217
(58) Field of Classification Search .............. 713/1, 2; 718/1; 709/217
See application file for complete search history.

(56) References Cited

U.S. PATENT DOCUMENTS

| | | | |
|---|---|---|---|
| 6,748,534 B1 | 6/2004 | Gryaznov et al. | |
| 7,136,981 B2 | 11/2006 | Burch et al. | |
| 7,254,596 B2 | 8/2007 | De Spiegeleer | |
| 7,392,261 B2 | 6/2008 | Clark et al. | |
| 7,624,240 B1 | 11/2009 | Colbert et al. | |
| 2002/0129047 A1 | 9/2002 | Cane et al. | |
| 2005/0114870 A1* | 5/2005 | Song et al. | 719/328 |
| 2007/0112787 A1 | 5/2007 | Burton et al. | |
| 2007/0220246 A1* | 9/2007 | Powell et al. | 713/2 |
| 2008/0270483 A1* | 10/2008 | Kumar et al. | 707/200 |
| 2009/0030957 A1 | 1/2009 | Manjunath | |
| 2009/0150332 A1 | 6/2009 | Zhuang et al. | |
| 2009/0198704 A1 | 8/2009 | Landberg | |
| 2009/0276774 A1* | 11/2009 | Kinoshita | 718/1 |
| 2010/0011200 A1* | 1/2010 | Rosenan | 713/2 |
| 2010/0036889 A1 | 2/2010 | Joshi et al. | |
| 2010/0088328 A1 | 4/2010 | Joshi et al. | |

OTHER PUBLICATIONS

Ben Pfaff, et al., "Virtualization Aware File Systems Getting Beyond the Limitations of Virtual Disks," Proceedings of the 3rd Conference on 3rd Symposium on Networked Systems Design & Implementation, vol. 3, San Jose, CA, Jun. 2006.

* cited by examiner

Primary Examiner — Thuan Du

(57) ABSTRACT

A filter driver that is loaded during an initial part of the boot process enable operating systems that are not capable of booting from central storage to be booted from central storage. According to this technique, an initial set of operating system files is loaded into system memory from a local storage volume. The initial set of files includes a small subset of all of the operating system files and includes a boot loader, a kernel, boot time drivers, a file system driver, and a filter driver. The filter driver takes control over the loading of the remainder of the operating system files, so that these files are loaded from central storage instead of the local storage volume.

25 Claims, 4 Drawing Sheets

BOOTING A COMPUTER SYSTEM FROM CENTRAL STORAGE

BACKGROUND OF THE INVENTION

Booting or bootstrapping is the process of starting up a computer from a halted or powered-down condition and loading an operating system into system memory of the computer. A computer may be booted from a local source, e.g., a hard disk that is part of the computer, or from a remote source, e.g., network storage as in a network boot.

Various techniques that allow computers to boot and run from network storage exist. At a high-level, they can be classified as a file-based network boot and an image-based network boot. In file-based network boot, which is supported by operating systems such as Unix®, Linux®, and Solaris®, a computer connected to a network storage is booted directly from the network storage. In image-based network boot, when the computer is powered on, an image of the operating system is downloaded using protocols like PXE/TFTP/BOOTP, and this image is used to load the operating system from the network storage.

Another technique for booting employs image streaming. This technique uses proprietary drivers to stream operating system images, that are stored on a central storage server, to a computer's system memory on an as-needed basis. As a result, computers in a network that employs image streaming do not maintain a copy of the operating system in their local storage.

The benefits of the technologies described above include central management and storage of an operating system and files of the operating system. If an anti-virus scanning of operating system files is needed, the scanning is carried out just once. They also permit computers to operate without local disks and provide an administrator control over what operating system files to make available to users.

However, not all operating systems permit booting from network storage or incorporate drivers that enable image streaming. The Windows operating system is one such example. When a Windows-based computer system is booted, the computer system's BIOS invokes a boot loader from a boot volume, which is typically a hard drive attached to the computer system, a floppy drive or an optical drive. In addition to the boot loader, a file system driver is loaded from the boot volume, and the file system driver is used in loading from the boot volume the remainder of the files that are required for the operating system to operate correctly.

SUMMARY OF THE INVENTION

One or more embodiments of the invention enable loading of an operating system from a central storage using a filter driver. As a result, operating systems such as Windows that are not capable of booting from central storage can be booted from central storage.

A method of loading an operating system according to an embodiment of the invention is carried out in a system having a central storage unit and multiple computer systems each with a local storage volume. The operating system has a first set of files including a boot loader, a kernel, and boot time drivers, and a second set of files including a majority of files required for correct operation of the operating system. The method includes the steps of loading the first set of files into the system memory from the local storage volume of the computer system, the first set of files further including a filter driver, and loading the second set of files into the system memory from the central storage unit using the filter driver.

A process for booting virtual machines according to an embodiment of the invention includes the steps of loading a first set of operating system files for the first virtual machine from a local storage volume of the first virtual machine, and loading a second set of operating system files for the second virtual machine from a local storage volume of the second virtual machine. When a file operation requesting loading of a third set of operating system files is issued by either the first virtual machine or the second virtual machine, the request is directed to a common storage unit and the third set of operating system files is loaded from the common storage unit.

A system according to an embodiment of the invention includes multiple computer systems each with a local storage volume that stores a set of operating system files and metadata for all of its files, and a central storage unit that is shared by the multiple computer systems. The system further includes a filter driver that selectively directs file system calls from the multiple computer systems to the central storage unit.

DETAILED DESCRIPTION

Figure 1:
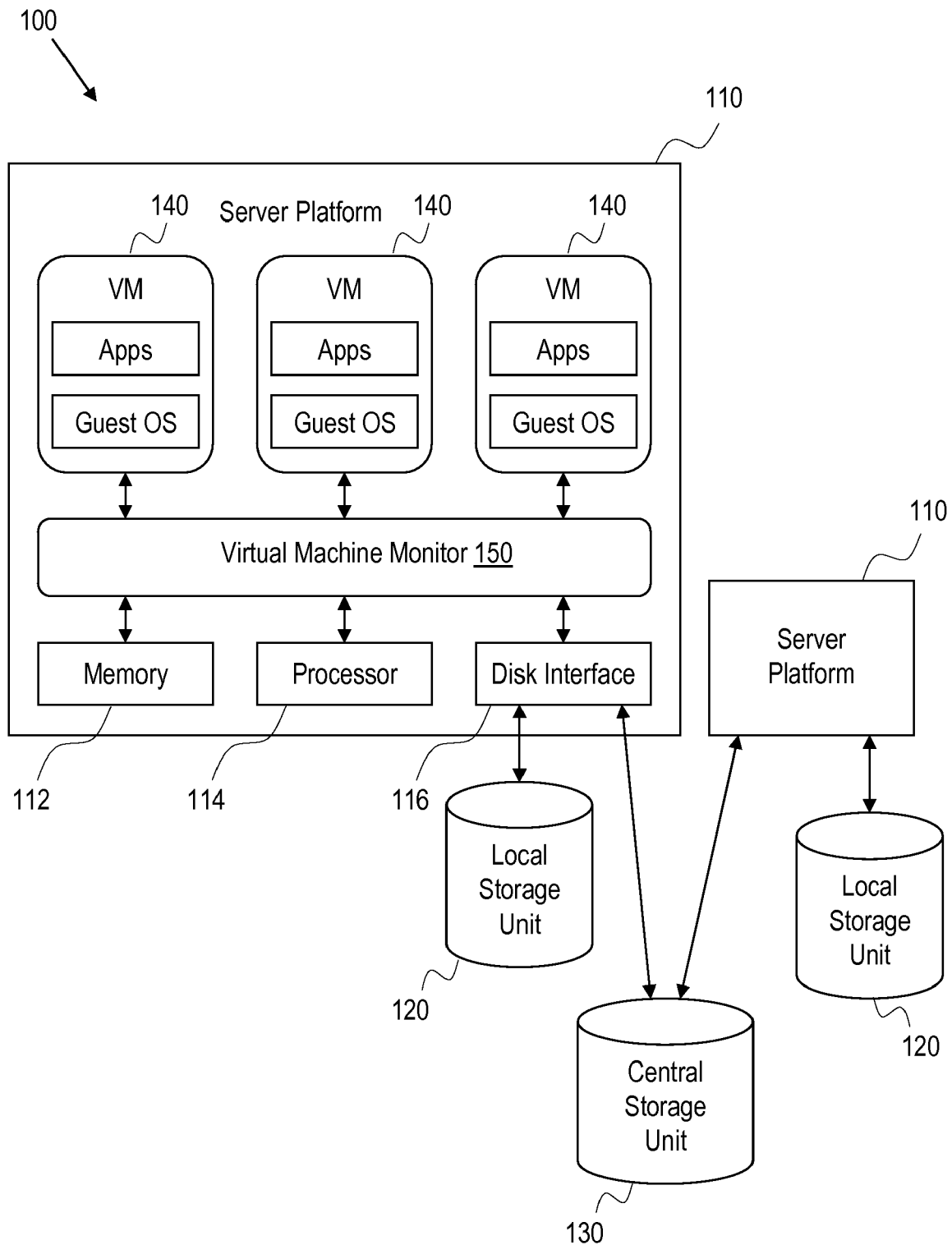
FIG. 1 is a functional block diagram of a computer system in which one or more embodiments of the invention may be practiced.

FIG. 1 is a functional block diagram of a computer system 100 in which one or more embodiments of the invention may be practiced. Computer system 100 includes server platforms 110, a local storage unit 120 for each server platform, and a central storage unit 130 that is shared by server platforms 110. Local storage unit 120 and central storage unit 130 may be implemented as network attached storage (NAS) or storage area network (SAN) arrays. Local storage unit 120 is dedicated to and provides storage for the server platform to which it is connected, and central storage unit 130 provides shared storage to all server platforms 110.

Each of server platforms 110 has conventional components of a server computer, and may be implemented as a cluster of multiple server computers. Each server platform has configured therein one or more virtual machines 140 that share hardware resources of the server platform, such as system memory 112, processor 114 and disk interface 116. One example of disk interface 116 is a host bus adapter. Virtual machines 140 run on top of a virtual machine monitor 150, which is a software interface layer that enables sharing of the hardware resources of the server platform by virtual machines 140. Virtual machine monitor 150 may run on top of the server platform's operating system or directly on hardware components of the server platform. Together, virtual machines 140 and virtual machine monitor 150 create virtualized computer systems that give the appearance of being distinct from the server platform and from each other. Each virtual machine includes a guest operating system and one or more guest applications. The guest operating system is a master control program of the virtual machine and, among other things, the guest operating system forms a software platform on top of which the guest applications run. A virtual disk for each of the virtual machines 140 is maintained within local storage unit 120.

Figure 2:
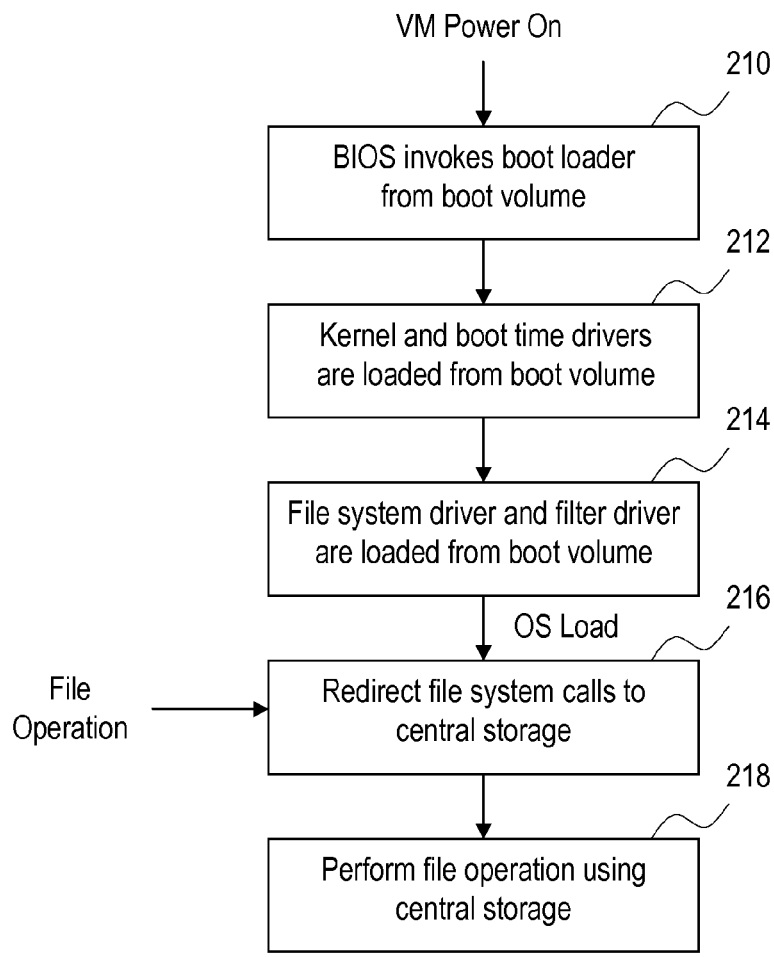
FIG. 2 illustrates a process for loading an operating system according to a first embodiment of the invention.

As in a conventional computer, when a virtual machine powers on, the operating system of the virtual machine is loaded. The process of loading an operating system into system memory (known as a boot process), according to a first embodiment of the invention, is illustrated in FIG. 2. The process begins at step 210 with the system BIOS (Basic Input/Output System) invoking a boot loader from a boot disk or, more generally, a boot volume. At step 212, the boot loader loads the kernel of the operating system and boot time drivers into system memory from the boot volume. At step 214, the boot loader loads into system memory a file system driver and a file system filter driver. The file system driver is the driver for the native file system of the operating system, e.g., NTFS for Windows NT operating systems. The file system filter driver is a software component that runs on top of the file system driver and redirects file system calls made to the file system. In the first embodiment of the invention, file system calls made to the file system are redirected to a central storage unit. As a result, when file system calls are made after the file system filter driver has been loaded into system memory, the file system calls are redirected to a central storage unit (step 216) and file operations are carried out using the central storage unit (step 218). If file system calls are made in conjunction with the boot process, e.g., to load the operating system files that remain unloaded after step 214, the remaining operating system files are loaded into system memory from the central storage unit instead of the boot volume. If file system calls are made in conjunction with a file operation issued after the boot process has completed, the file operation is performed using the central storage unit.

Figure 3:
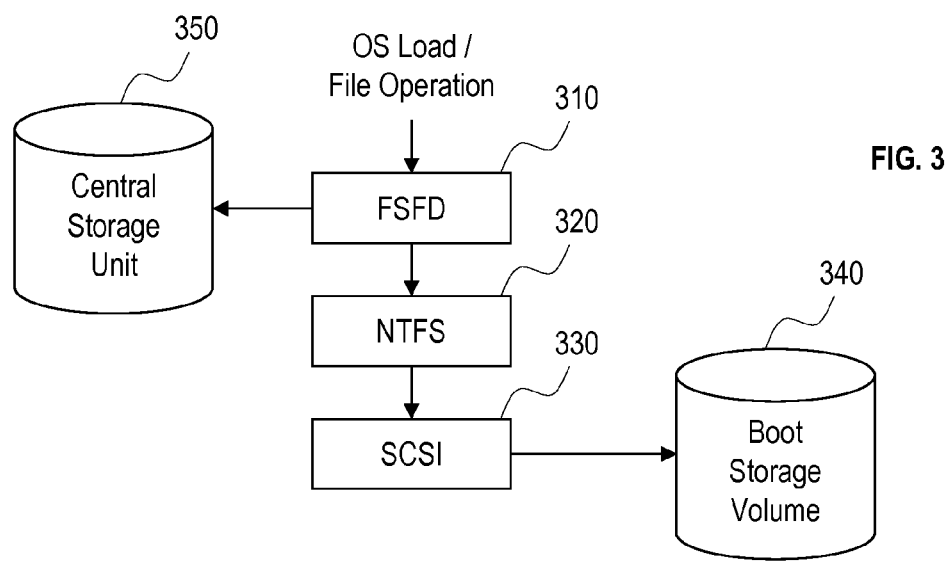
FIG. 3 schematically illustrates a file input/output process after a file system driver and a file system filter driver have been loaded.

FIG. 3 schematically illustrates a file input/output process after the file system driver and the file system filter driver have been loaded into system memory. In FIG. 3, the file system filter driver is shown as FSFD 310, the NTFS file system driver as NTFS 320, and a SCSI driver as SCSI 330. Before FSFD 310 is loaded into system memory, files are accessed and loaded from a boot storage volume 340. When a virtual machine is being booted, boot storage volume 340 may be a portion of a virtual disk associated with the virtual machine or may be streamed in using PXE/TFTP protocols. After FSFD 310 is loaded into system memory and runs on top of NTFS 320, FSFD 310 redirects file accesses to a central storage unit 350. In the embodiment illustrated in FIG. 1, boot storage volume 340 is contained within local storage unit 120 and central storage unit 350 corresponds to central storage unit 130.

Figure 4:
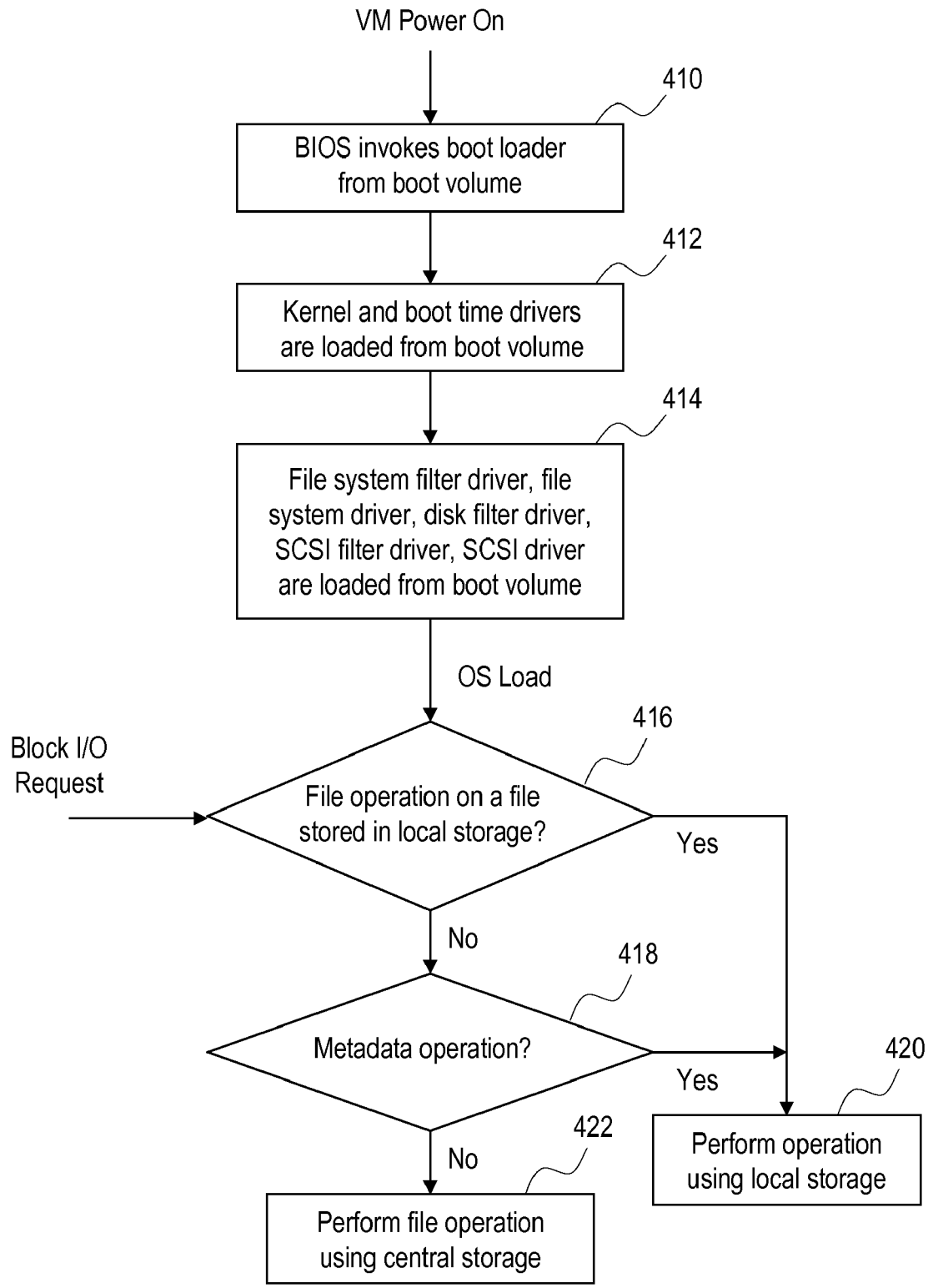
FIG. 4 illustrates a process for loading an operating system according to a second embodiment of the invention.

A process for loading an operating system into system memory according to a second embodiment of the invention is illustrated in FIG. 4. The process begins at step 410 with the system BIOS (Basic Input/Output System) invoking a boot loader from a boot disk or, more generally, a boot volume. At step 412, the boot loader loads the kernel of the operating system and boot time drivers into system memory from the boot volume. At step 414, the boot loader also loads into system memory a file system filter driver, a file system driver, a disk filter driver, a SCSI filter driver, and a SCSI driver.

The file system filter driver is a software component that runs on top of the file system driver and maintains a map between block numbers and files on which input/output is performed. This map is a table that is loaded into system memory with the file system filter driver. This table associates block numbers with a file ID and an offset inside the file, and is modified every time the file layout information changes such as when a file is created, deleted, extended, truncated, etc. The file system driver is the driver for the native file system of the operating system, e.g., NTFS for Windows NT operating systems. The disk filter driver is a software component that runs below the file system driver and tags block input/output requests representing file input/output operations. Block input/output requests for metadata blocks (i.e., "metadata operations") are not tagged. The disk filter driver only sees block numbers and thus it employs the map between block numbers and files as maintained by the file system filter driver to distinguish between the different types of operations and perform the tagging. Tag information contains a flag indicating a file input/output operation, and the file ID and offset information obtained from the map. The SCSI filter driver examines the tags on the block input/output requests that it receives to differentiate between file input/output and metadata operations. The SCSI driver manages accesses to the local storage unit.

Steps 416, 418, 420 and 422 are carried out after the file system filter driver, the file system driver, the disk filter driver, the SCSI filter driver, and the SCSI driver have been loaded. The SCSI filter driver determines whether a block input/output request that it receives is an operation for a file stored in the local storage unit (step 416) or is a metadata operation (step 418). If either condition is true, the operation is carried out using the local storage unit at step 420. If both conditions are false, the operation is carried out using the central storage unit at step 422. In accordance with steps 416, 418, 420 and 422, operating system files that remain unloaded after step 414 are loaded into system memory from the central storage unit.

Figure 5:
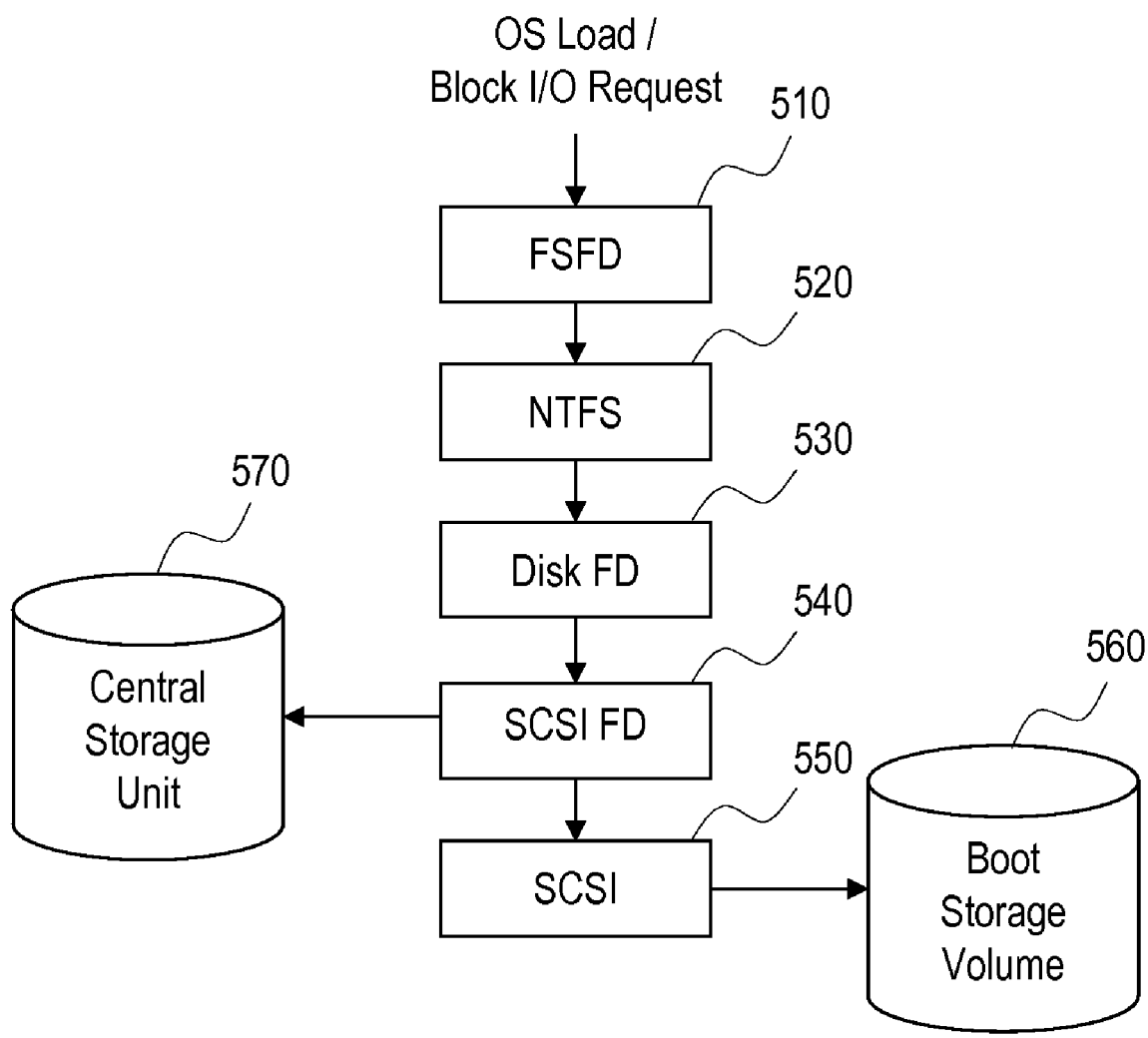
FIG. 5 schematically illustrates a file input/output process after a file system filter driver, a file system driver, a disk filter driver, a SCSI filter driver, and a SCSI driver have been loaded.

FIG. 5 schematically illustrates a file input/output process after the file system filter driver, the file system driver, the disk filter driver, the SCSI filter driver, and the SCSI driver have been loaded into system memory. In FIG. 5, the file system filter driver is shown as FSFD 510, the NTFS file system driver as NTFS 520, the disk filter driver as Disk FD 530, a SCSI filter driver as SCSI FD 540, and a SCSI driver as SCSI 550. Before Disk FD 530 and SCSI FD 540 are loaded into system memory, files are accessed and loaded from a boot storage volume 560. When a virtual machine is being booted, boot storage volume 560 may be a portion of a virtual disk associated with the virtual machine or may be streamed in using PXE/TFTP protocols. After Disk FD 530 and SCSI FD 540 are loaded into system memory and runs below NTFS 520, file input/output operations are directed to a central storage unit 570, whereas metadata operations and file input/output operations involving files stored in boot storage volume 560 are directed to boot storage volume 560. In the embodiment illustrated in FIG. 5, boot storage volume 560 is contained within local storage unit 120 and central storage unit 570 corresponds to central storage unit 130.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. In a system having a central storage unit and multiple computer systems each with a local storage volume, a method of loading an operating system into a system memory of a computer system, the operating system having a first set of files including a boot loader, a kernel, and boot time drivers, and a second set of files including a majority of files required for correct operation of the operating system, said method comprising:
    loading the first set of files into the system memory from the local storage volume of the computer system, the first set of files further including a filter driver configured to intercept file system calls made to a file system driver and redirect the file system calls to the central storage unit; and
    loading the second set of files into the system memory from the central storage unit using the filter driver.

2. The method according to claim 1, wherein the central storage unit comprises a network attached storage.

3. The method according to claim 1, wherein the computer systems are virtual machines and the operating systems are guest operating systems for the virtual machines.

4. The method according to claim 3, wherein the virtual machines share the same hardware platform.

5. The method according to claim 3, wherein a first group of the virtual machines share a first hardware platform and a second group of the virtual machines share a second hardware platform that is different from the first hardware platform.

6. The method according to claim 1, wherein the step of loading the second set of files includes: at the filter driver, receiving a request to load the second set of files into the system memory and directing the load request to the central storage unit.

7. The method according to claim 6, wherein the filter driver receives the load request before a file system driver of the computer system receives the load request.

8. The method according to claim 6, wherein the filter driver receives the load request after a file system driver of the computer system receives the load request.

9. The method according to claim 8, wherein the computer systems are virtual machines and the operating systems are guest operating systems for the virtual machines, and each virtual machine is connected to its local storage volume through a SCSI driver.

10. The method according to claim 9, wherein the filter driver is a SCSI filter driver that directs load requests of all files other than the first set of files to the central storage unit.

11. The method of claim 1, wherein the filter driver is further configured to maintain a mapping between block numbers and files corresponding to received file I/O operations.

12. The method of claim 11, wherein the mapping is utilized by a block-level driver operating below the file system driver to distinguish block numbers relating to metadata operations and block numbers relating to file I/O operations.

13. In a computer system having first and second virtual machines each with a local storage volume, a process for booting the first virtual machine and the second virtual machine, comprising:

loading a first set of operating system files for the first virtual machine from the local storage volume of the first virtual machine;

loading a second set of operating system files for the second virtual machine from the local storage volume of the second virtual machine; and redirecting file system calls from the first virtual machine and the second virtual machine so that a third set of operating system files are loaded from a common storage unit.

14. The process according to claim 13, wherein each of the first and second sets of operating system files includes a boot loader, a kernel, and boot time drivers.

15. The process according to claim 14, wherein each of the first and second sets of operating system files further includes a filter driver for redirecting the file system calls.

16. The process according to claim 15, wherein the first set of operating system files further includes a file system driver that directs file system calls to the local storage volume of the first virtual machine and the second set of operating system files further includes a file system driver that directs file system calls to the local storage volume of the second virtual machine.

17. A system having a central storage unit and multiple computer systems each with a local storage volume that stores a set of operating system files and metadata for all of its files, the system comprising a filter driver configured to intercept calls that are made to an underlying driver in conjunction with I/O operations and that assists in selectively redirecting the calls in conjunction with I/O operations from the multiple computer systems to the central storage unit.

18. The system according to claim 17, wherein a request to load a file that is not in the set of operating system files is directed to the central storage unit.

19. The system according to claim 17, wherein a request to load a metadata for a file that is not in the set of operating system files is directed to the corresponding local storage volume.

20. The system according to claim 17, wherein the set of operating system files includes a boot loader, a kernel, and boot time drivers.

21. The system according to claim 20, wherein the computer systems are virtual machines, and each virtual machine is connected to its local storage volume through a common SCSI driver.

22. The system according to claim 21, wherein the filter driver receives the I/O operations before the common SCSI driver.

23. The method of claim 17, wherein the underlying driver is a file system driver and the filter driver is a file system filter driver that maintains a mapping between block numbers and files corresponding to received file I/O operations.

24. The method of claim 17, wherein the underlying driver is a disk driver and the filter driver is a disk filter driver that tags block I/O requests representing file I/O operations rather than metadata operations.

25. The method of claim 17, wherein the underlying driver is a SCSI driver and the filter driver is a SCSI filter driver that examines tags in block I/O requests to differentiate between file I/O operations and metadata operations.

* * * * *